United States Patent
Chavez et al.

(10) Patent No.: US 10,504,302 B1
(45) Date of Patent: Dec. 10, 2019

(54) 360 DEGREE VEHICLE CAMERA ACCIDENT MONITORING SYSTEM

(71) Applicant: United Services Automobile Association (USAA), San Antonio, TX (US)

(72) Inventors: Carlos Chavez, San Antonio, TX (US); Amanda Shannon Danko, San Antonio, TX (US); Kevin Kenneth Fiedler, Boerne, TX (US); Michael Jay Szentes, San Antonio, TX (US); James Stephan Harrison, Bulverde, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 214 days.

(21) Appl. No.: 15/380,514

(22) Filed: Dec. 15, 2016

Related U.S. Application Data

(60) Provisional application No. 62/271,014, filed on Dec. 22, 2015.

(51) Int. Cl.
   *G07C 5/00* (2006.01)
   *G07C 5/08* (2006.01)
   *H04L 29/08* (2006.01)
   *G06Q 40/08* (2012.01)

(52) U.S. Cl.
   CPC ............ *G07C 5/008* (2013.01); *G06Q 40/08* (2013.01); *G07C 5/0866* (2013.01); *H04L 67/10* (2013.01)

(58) Field of Classification Search
   CPC ...... G07C 5/008; G07C 5/0866; G06Q 40/08; H04L 67/10
   USPC .......................................................... 701/29.3
   See application file for complete search history.

(56) References Cited

U.S. PATENT DOCUMENTS

| | | | | |
|---|---|---|---|---|
| 8,396,623 | B2 * | 3/2013 | Maeda | G07C 5/0891 |
| | | | | 701/29.1 |
| 9,387,813 | B1 * | 7/2016 | Moeller | B60R 11/04 |
| 9,524,269 | B1 * | 12/2016 | Brinkmann | G06F 17/00 |
| 2007/0136078 | A1 * | 6/2007 | Plante | G06Q 10/00 |
| | | | | 348/148 |
| 2013/0332004 | A1 * | 12/2013 | Gompert | G07C 5/008 |
| | | | | 701/1 |
| 2014/0313335 | A1 * | 10/2014 | Koravadi | H04N 7/181 |
| | | | | 348/148 |
| 2015/0235484 | A1 * | 8/2015 | Kraeling | G07C 5/0866 |
| | | | | 701/1 |
| 2017/0263120 | A1 * | 9/2017 | Durie, Jr. | G08G 1/205 |
| 2018/0108252 | A1 * | 4/2018 | Pividori | G07C 5/008 |
| 2018/0367514 | A1 * | 12/2018 | Kido | H04B 10/116 |

* cited by examiner

*Primary Examiner* — Krishnan Ramesh
(74) *Attorney, Agent, or Firm* — Brinks Gilson & Lione

(57) ABSTRACT

A vehicle monitoring system with a camera is disclosed for creating video or still photo data at the time of a detected accident. The monitoring system monitors a vehicle parameter using a sensor contained within the vehicle. The system may use a processor contained within the vehicle to monitor the vehicle parameter. The system sets a parameter threshold. When the system detects, using the sensor, that the parameter has met the threshold it captures a video or still photo of an area surrounding the vehicle. The system then stores and/or transmits the video or still photo data to a remote server over a network.

20 Claims, 10 Drawing Sheets

360 DEGREE VEHICLE CAMERA ACCIDENT MONITORING SYSTEM

CROSS-REFERENCE TO RELATED APPLICATION(S)

This application claims the benefit of U.S. Provisional Patent Application No. 62/271,014, filed Dec. 22, 2015, the entirety of which is hereby incorporated by reference herein.

TECHNICAL FIELD

The present disclosure relates to monitoring vehicle status, and more specifically to systems and methods for accident recording.

BACKGROUND

Automobiles, cars, trucks, vans, motorcycles, boats or any other motorized apparatus, collectively referred to herein as vehicles, are prevalent throughout society. Vehicles accidents are a major cause of personal injuries and property damage. Police, accident investigators, and insurance companies may spend significant time investigating the cause of an accident. These investigations often suffer from a lack of reliable information and often rely on the testimony of witnesses. Witness accounts are often unreliable and a more reliable system for determining the cause of vehicle accidents is needed.

SUMMARY

A vehicle monitoring system is provided which has a camera for creating video or still photo data in response to detecting an accident. The monitoring system monitors a vehicle parameter using a sensor contained within the vehicle. The system may use a processor contained within the vehicle to monitor the vehicle parameter. The system sets a parameter threshold. When the system detects, using the sensor, the parameter has met the threshold it captures a video or still photo of an area surrounding the vehicle. The system then transmits the image(s), video or other captured data to a remote server using a network.

DETAILED DESCRIPTION

The present disclosure relates to a vehicle monitoring system for detecting and recording vehicle accidents based on a set of characteristics. The present disclosure further relates to recording vehicle accidents and other damage for evidentiary purposes and to more accurately determine the cause of an accident. The system may use one or more cameras (video or still), microphones, or other data collection and transmission systems, within a vehicle, in order to detect and temporarily store accident-related images and sounds. The system may also record other accident-related data, such as time and location, and may transmit the images and data to a remote location where the information can be reviewed.

The system uses a camera or cameras to record the area surrounding a vehicle. Insurance companies may use this video to help investigate the cause of an accident when an insured makes an automobile insurance claim. Alternative uses of the video are also considered. The video may be used by law enforcement or private investigators conducting investigations. Insurance providers may use the video to determine the operating habits of a vehicle operator to adjust insurance rates and premiums. If other vehicles in an area also have data recordation and transmission systems they may be triggered to record video and other data that may be used to record different angles of an accident, study traffic patterns, or be used to conduct other vehicle related studies.

Figure 1A:
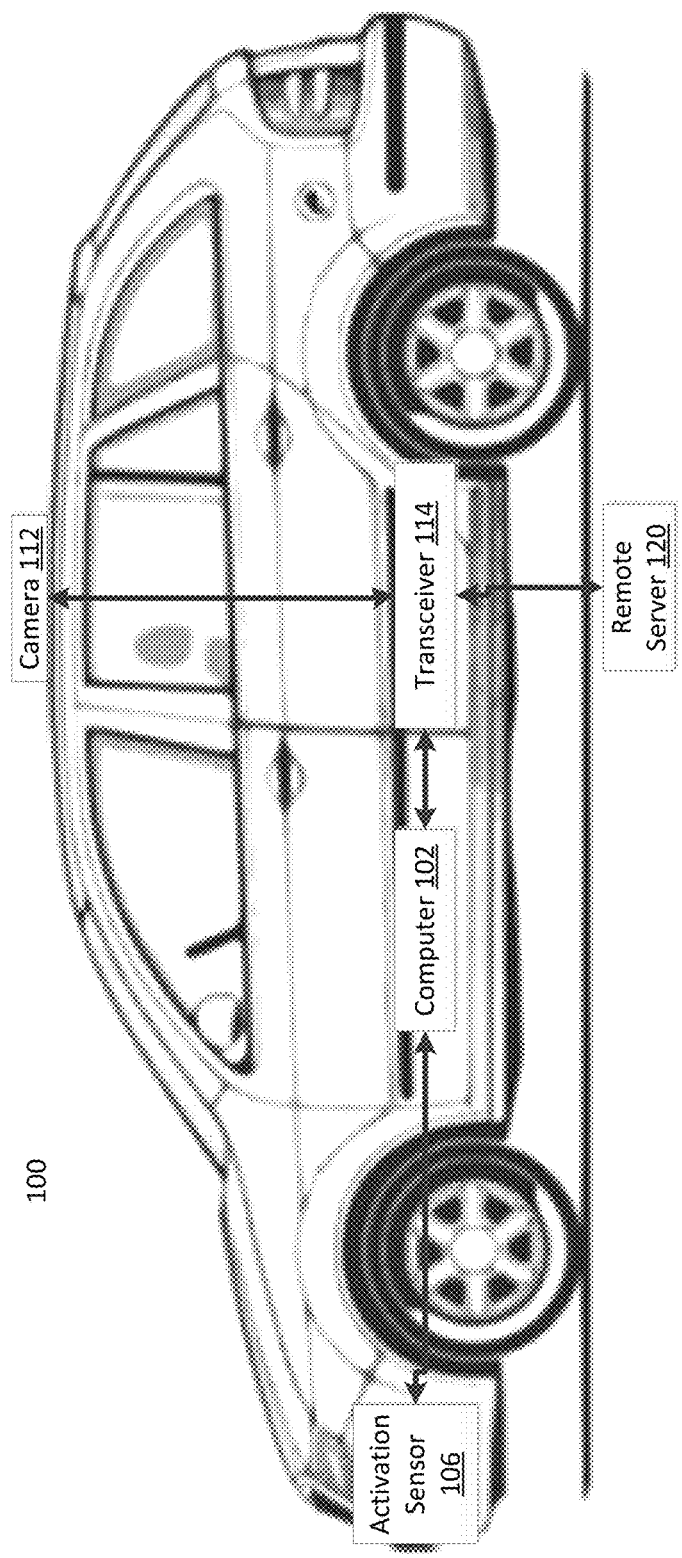
FIG. 1A illustrates a vehicle with a camera and an activation sensor.

Referring to FIG. 1A, in one embodiment the system may be implemented using a computer 102 housed within a vehicle 100. The system uses an activation sensor 106 to detect an imminent vehicle 100 accident. The activation sensor 106 measures a parameter related to the vehicle 100 or the surrounding environment. The activation sensor 106 may be an accelerometer that may be used to measure the acceleration and deceleration of a vehicle 100. If the activation sensor 106 detects a measurement that meets an activation threshold it will send an activation signal to the computer 102. In the current embodiment, the threshold may be a certain deceleration. If the vehicle's 100 speed decreases a threshold amount in less than or equal to a specified period of a time the activation sensor 106 will send a signal to the computer 102. The computer 102 will then activate a data recordation system. As an example, the sensor activation threshold may be set for −12 meters per second squared (m/s$^2$). In one example scenario, the vehicle 100 may be traveling at 50 kilometers per hour (km/hr) and the vehicle's 100 operator notices a stopped vehicle. The vehicle's 100 operator applies the brakes and starts slowing down at a rate of −12.5 m/s$^2$. The accelerometer would detect that −12.5 m/s$^2$ exceeds the activation threshold of −12 m/s$^2$ and send the signal to activate the data recordation system (for example, send a signal to the video or still camera to start data recordation).

The data recordation system may include a video camera, a still camera, a microphone, or any other device capable of recording data. In the present embodiment the data recordation system may be a video camera 112 stored on or in the roof of a vehicle 100. The camera 112 includes a processor or switch capable of receiving an activation signal from the computer 102. After the processor receives an activation signal the processor activates the video camera 112. The video camera 112 may then immediately pop-out of the roof of the vehicle 100 and begin recording the surrounding environment. The camera 112 would record an area consisting of the 360° surrounding the vehicle 100. As the camera 112 records 360° a front end collision, a rear end collision, or a side collision would be captured.

The vehicle 100 has a central computer 102 running a program (such as a set of instruction stored on a memory and being executed by a processor) that controls the activation sensor 106 and the camera 112. The program detects the activation signal from the activation sensor 106 and sends a second activation signal to the camera 112. The program may receive the captured video from the camera 112. The program also controls a transceiver 114 for transmitting the video and other data to a remote server 120 using a network. The transceiver 114 may transmit the video to the network in real time (i.e. the video may be streamed live to the server). The video may be transmitted in real time in order to preserve the video in the event the vehicle 100 or camera 112 is heavily damaged. In the event the camera 112 is damaged so heavily it ceases recording the captured video is preserved on the remote server 120.

The remote server 120 may be used as an insurance management system. An insurance investigator can review the captured video in order to determine fault for an accident. The captured video can greatly reduce the time and expense required to properly assess who is at fault in an accident. An insurance investigation can rely on incorruptible video evidence instead of relying on sometimes unreliable witness accounts or sending an investigator to the scene of an accident. The captured video can also greatly reduce the need to obtain other evidence thereby decreasing the time and cost required to complete an investigation.

Figure 2:
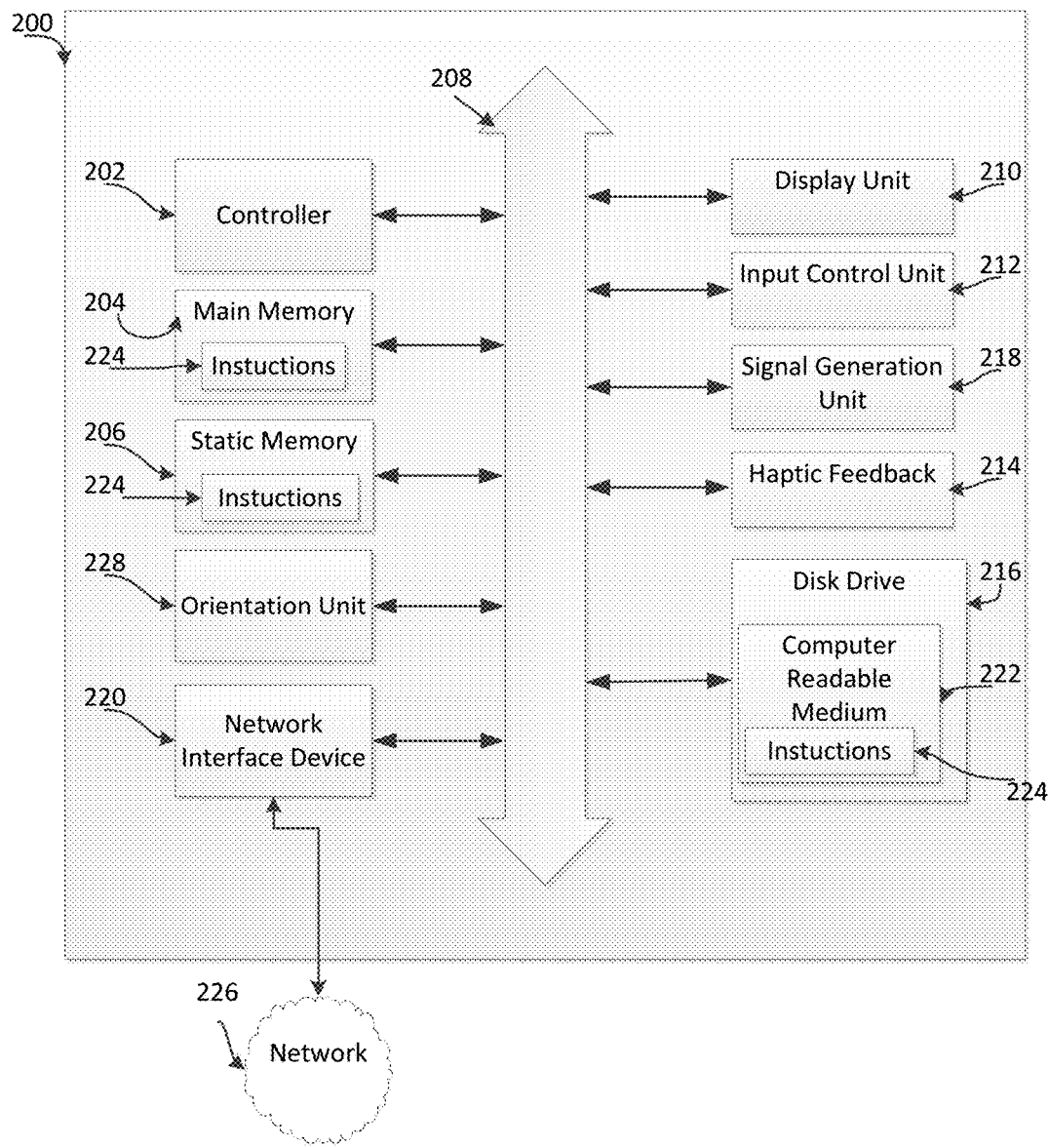
FIG. 2 illustrates a computer system.

As illustrated in FIG. 2, the computer system 200 may be representative of the computer 102 included in the vehicle 100. Computer system 200 includes a controller 202, such as a central processing unit ("CPU"), a graphics processing unit ("GPU"), or both. Moreover, the computer system 200 can include a main memory 204, and additionally may include a static memory 206. In embodiments where more than one memory components are included in the computer system 200, the memory components can communicate with each other via a bus 208. As shown, the computer system 200 may further include a display unit 210, such as a liquid crystal display ("LCD"), an organic light emitting diode ("OLED"), a flat panel display, a solid state display, or a cathode ray tube ("CRT"). The display unit 210 may, for example, correspond to a display in the dashboard of a car. The display unit 210 may be a heads-up display on a car windshield. Additionally, the computer system 200 may include one or more input devices 212, such as a keyboard, push button(s), scroll wheel, visual command recognition, touch screen, touchpad or audio input device (for example, microphone). The computer system 200 can also include signal outputting components such as a haptic feedback component 214 and a signal generation device 218 that may include a speaker or remote control.

As previously disclosed, the computer system 200 may additionally include a GPS (Global Positioning System) component 229 for identifying a location of the computer system 200 and the vehicle. The GPS component 229 may be a hardware receiver or software for working in conjunction with a remotely located received.

The computer system 200 may also include a network interface device 220 to allow the computer system 200 to communicate via wireless, or wired, communication channels with other devices. The network interface device 220 may be an interface for communicating with another computer system via a Wi-Fi connection, Bluetooth connection, Near Frequency Communication (NFC) connection, telecommunications connection, internet connection, wired Ethernet connection, or the like. The computer system 200 may also optionally include a disk drive unit 216 for accepting a computer readable medium 222. The computer readable medium 222 may include a set of instructions that are executable by the controller 202, and/or the computer readable medium 222 may be utilized by the computer system 200 as additional memory storage.

In a particular embodiment, as depicted in FIG. 2, the disk drive unit 216 may include a computer-readable medium 222 in which one or more sets of instructions 224, such as software, can be embedded. Further, the instructions 224 may embody one or more of the methods, processes, or logic as described herein. In a particular embodiment, the instructions 224 may reside completely, or at least partially, within the main memory 204, the static memory 206, and/or within the controller 202 during execution by the computer system 200. The main memory 204 and the controller 202 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present computer system 200 may encompass software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 222 that includes instructions 224 or receives and executes instructions 224 responsive to a propagated signal; so that a device connected to a network 226 can communicate voice, video or data over the network 226. Further, the instructions 224 may be transmitted or received over the network 226 via the network interface device 220.

While the computer-readable medium 224 is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium 222 can include a solid-state memory such as a memory card or other package that houses one or more non-volatile read-only memories, such as flash memory. Further, the computer-readable medium 222 can be a random access memory or other volatile re-writable memory. Additionally, the computer-readable medium 222 can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium 222 or a distribution medium and other equivalents and successor media, in which data or instructions may be stored.

Although the present specification describes components and functions that may be implemented in particular embodiments with reference to particular standards and protocols commonly used by financial institutions, the disclosure is not limited to such standards and protocols. For example, standards for Internet and other packet switched network transmission (for example, TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Figure 1B:
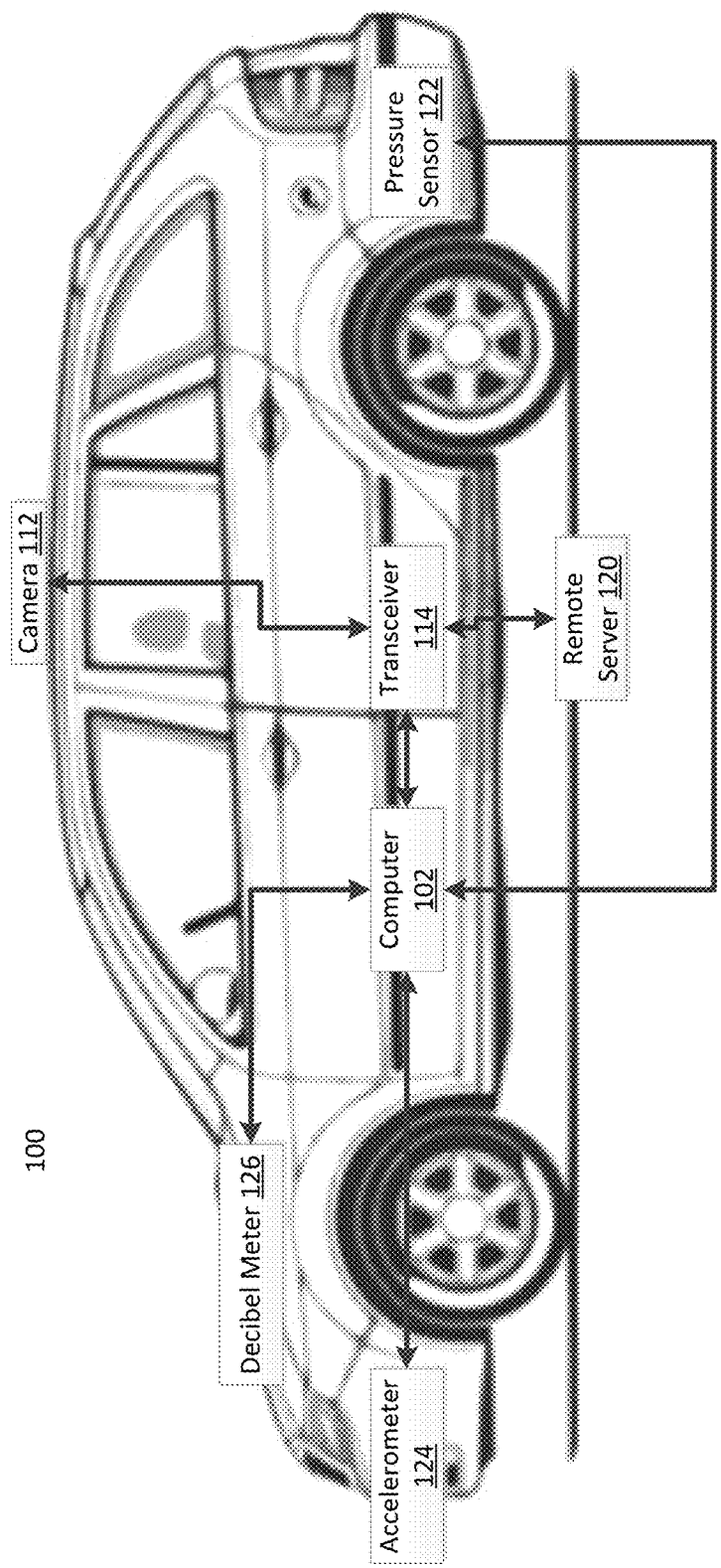
FIG. 1B illustrates a vehicle with multiple sensors and a camera.

In another example embodiment, shown in FIG. 1B, the system includes multiple and varied sensors 122, 124, and 126. As an example, the system may include a pressure sensor 122, an accelerometer 124, and a decibel meter 126. In this embodiment each sensor 122, 124, and 126 has an activation threshold based on the parameter the sensor is designed to monitor (force/unit area, m/s$^2$, and decibel level respectively). A single sensor 122, 124, or 126 measuring its corresponding activation threshold 104 may trigger an activation threshold as described with respect to FIG. 3 (discussed below). The system may also require two or more sensors 122, 124, or 126 to meet the activation threshold before triggering the accident recording system. If the system requires two or more activation signals the system may prevent false signals and prevent unwanted recording and transmission of video that is not recording an accident or potential accident. Also considered is a system that has multiple of a single type of sensor 122, 124, or 126, such as a vehicle 101 having multiple pressure sensors 122 at varying points in the vehicle 101 body. A vehicle 101 may require multiple pressure sensors 122, accelerometer 124, or other types of sensors in order to accurately determine if an accident is occurring. A system with multiple types of sensors would still be effective in the event of a sensor failure.

Those skilled in the art will appreciate that other triggers and sensors may be used in the system. The system is not limited to accelerometers, decibel meters, and/or pressure sensors. The system may be triggered by one of the vehicles safety systems being deployed such as the use of anti-lock brakes or the air bags being deployed. Alternatively the system could be triggered using a distance sensor such as a laser range finder, an ultrasonic sensor, an infrared sensor, or some other type of distance sensor. Other systems triggers could be used such as a system that monitors driver alertness or that monitors for objects in the vehicles path. In another embodiment, the system contains a light sensor that can detect vehicle brake lights of vehicles traveling in front of the monitoring vehicle. The driver could also manually trigger the monitoring system using a button, a voice command, or some other manual trigger. Those skilled in the art will appreciate that a multitude of other sensors and triggers could be used and the embodiments are not limited to the listed sensors.

In one embodiment the vehicle 100 has an onboard diagnostic (OBD) system. The OBD may be a system configured to continuously monitor various aspects of a vehicle 100 such as the powertrain, emissions, chassis, and body of the vehicle, as well as other vehicle aspects. The OBD can be monitoring various automotive sensors built within the vehicle 100. In the automotive industry there is an industry wide standard for OBD computers, and what the OBD system monitors, known as OBD-II. These standard sensors provide data relating to various vehicle systems including the engine, transmission, chassis, and other vehicle systems. In one embodiment the activation sensor 106 or activation sensors are sensors already incorporated in the OBD. In this embodiment the computer 102 may be the OBD computer or may be a separate computer 102. In another embodiment the activation sensor 106 or sensors are separate from the OBD. In this embodiment the computer 102 may be the OBD computer or may be a separate computer 102.

In one embodiment the camera 112 may be a single video camera that captures a 360° panoramic view of the area surrounding a vehicle. In this embodiment the camera 112 may be mounted on the roof of the center of the vehicle 100. In the event the vehicle 100 is a boat, truck, or some other vehicle without an obvious mounting position the camera would be mounted in a position where it may best capture all 360° surrounding the vehicle. Alternatively the camera may be multiple cameras mounted at a single location in order to capture 360°. As an example, there may be 3 cameras; each camera would be spaced 120° around a point from one another. With this setup each camera would capture 120° of the area surrounding the vehicle 100 and the three cameras together may capture 360°. This setup may be applied to any number of cameras. In an embodiment with 5 cameras, each camera would be responsible for 72° of the area surrounding the vehicle. A setup with a large number of cameras, or overlapping fields of view, may be beneficial to the systems integrity. In the event one camera or lens is damaged the remaining cameras may still capture a large percentage of the area surrounding the vehicle.

In the embodiment below, the vehicle discussed is a car but it can be any other type of vehicle. The cameras may be positioned in such a way as to capture spaces very near to the vehicle as well as spaces far away from the vehicle. As an example, if the vehicle 100 is a car, truck, sport utility vehicle, van, or some other automobile designed to be operated on roads or highways it would be important to capture large distances in front and behind the vehicle. Accidents may be started by automobiles far in front of the monitored vehicle. A vehicle four vehicles in front of the monitored vehicle 100 may come to an abrupt stop and the three subsequent vehicles and the monitored vehicle 100 may become involved in the accident. It would be helpful to capture as many of these vehicles as possible in the video, images, or other data. If the video only captured the vehicle directly in front of the monitored vehicle it might be more difficult to determine who is at fault for the accident. Similarly, it may be helpful to capture images and other data as far behind the vehicle as possible. It may also be helpful to capture the areas to the side of vehicle 100. Many modern highways, interstates, and freeways are multiple lanes and can be up to 10 or 12 lanes wide. Other vehicles, such as boats or planes, do not travel within designated paths which may create an even greater need to capture the area to the side of the vehicles. The camera or cameras 112 may be high resolution cameras in order to facilitate larger area capture and visibility. The camera or cameras 112 may be a high-speed camera in order to capture high speed video and create a more detailed evidentiary record. High speed cameras are used in vehicle impact testing which illustrates the benefits a high speed camera may have in the current disclosure. The camera or cameras may also incorporate a zoom to capture areas further away from the vehicle. In one embodiment, there may be multiple cameras, one camera designated to capture spaces close to the vehicle and another camera designed to capture spaces further away.

Figure 1C:
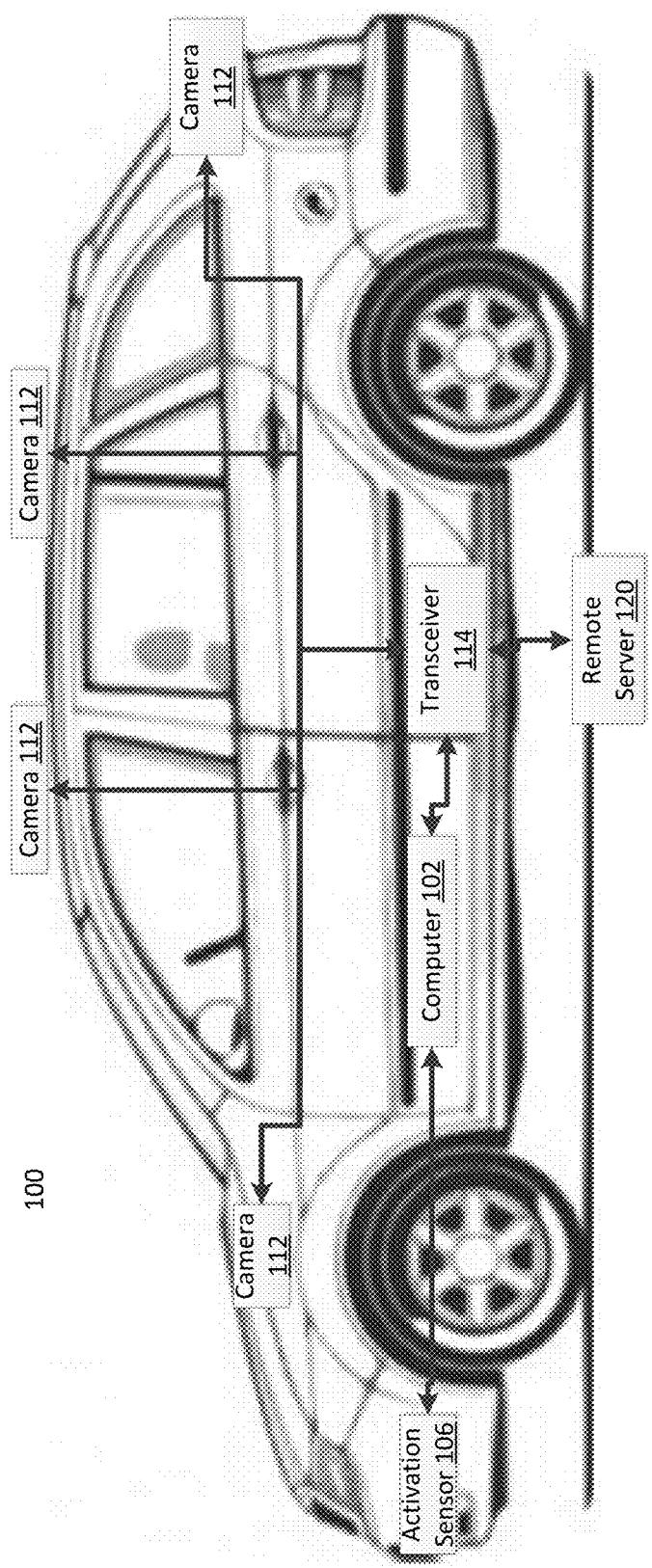
FIG. 1C illustrates a vehicle with multiple cameras and an activation sensor.

In the embodiment below the vehicle may be a car but it can be any other type of vehicle. In one embodiment, as illustrated in FIG. 1C, a camera or cameras 112 are permanently installed in the body of the vehicle 100. There may be a single permanently installed camera 112, such as a dash cam, or multiple permanent cameras 112 may be installed in various positions around the vehicle 100 in order to capture all areas surrounding the vehicle 100. However, when the vehicle 100 is not in operation, a camera 112 permanently exposed to the exterior of the vehicle may be exposed to damage such as damage to the camera 112 lens. In another embodiment, also illustrated by FIG. 1C, the camera 112 may be stored within a vehicle 100 and pops-out of the vehicle 100 body when the triggering event is sensed. The camera 112 may pop-out of a hood, the roof, the trunk, the bumper, the doors, or some other part of the vehicle 100. Multiple cameras 112 may pop-out of different areas of the vehicle 100. Which cameras 112 pop-out of which areas may be determined based on the triggering event. An algorithm implemented on the computer 102 may determine which areas surrounding the vehicle 100 need to be captured and the computer 102 would send activation signals to the camera 112 designated to capture the required areas. As an example, if the activation threshold is met by a pressure sensor 122 in the rear bumper of a vehicle 100 the computer 102 may signal the cameras 112 covering the area behind the vehicle 100 to record video while the other cameras remain dormant. Alternatively, the computer 102 may activate all of the cameras 112 regardless of which activation sensor 106 sends an activation signal. This camera setup is applicable to other types of vehicles than the vehicle described with respect to FIG. 1C.

Alternatively, the system may incorporate a camera or cameras designed to swivel and tilt. In this embodiment the cameras are capable of capturing different areas around the vehicle. In the event an activation sensor sends an activation signal the computer would determine which sensor sent the signal and would direct the cameras to point at the area corresponding to the signal.

Figure 3:
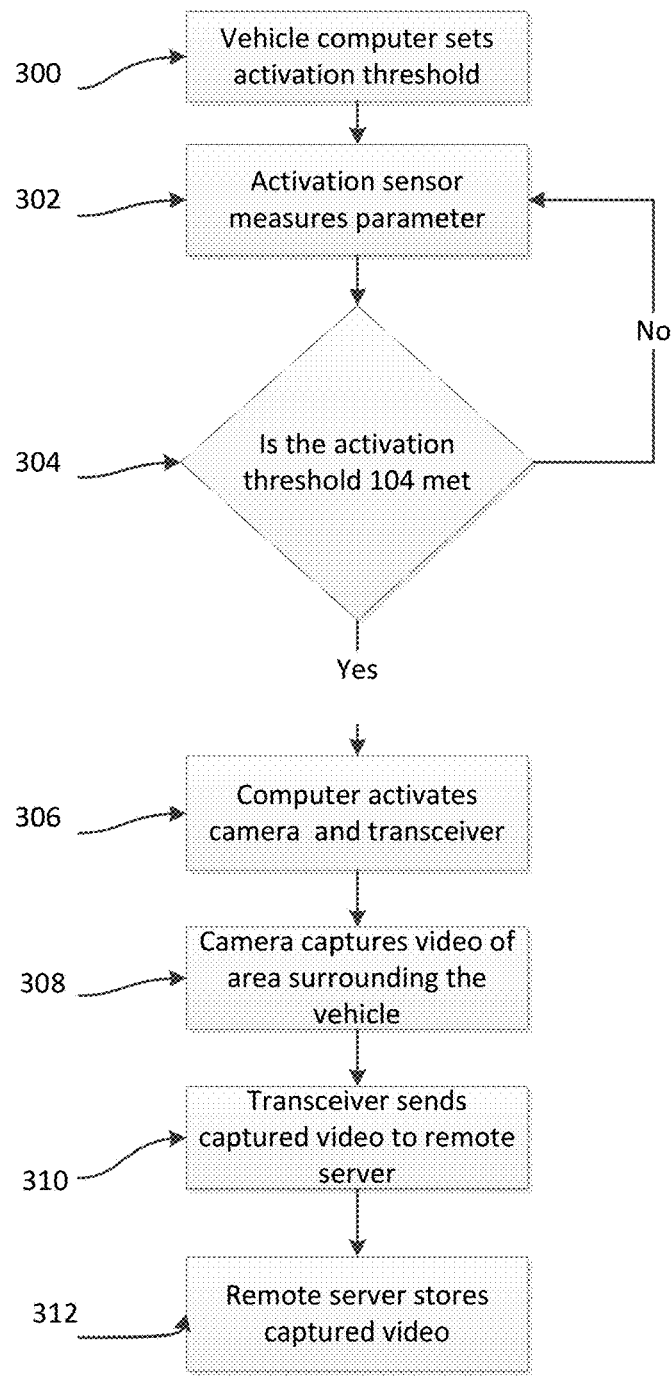
FIG. 3 is a flow diagram illustrating an embodiment of a method for determining when to initiate capture of the area surrounding the vehicle.

FIG. 3 is a block diagram illustrating one possible implementation of a system of monitoring a vehicle such as that shown in FIGS. 1A-1C. At 300 the computer 102 (using the program stored on the memory being executed by the processor) sets an activation threshold for the activation sensor 106. At 302 the activation sensor 106 measures the parameter. If the activation threshold is not met the activation sensor 106 will continue to monitor the parameter. If the activation threshold is met, at 306, the computer 102 will activate the camera 112 and transceiver 114. The transceiver 114 may be activated at the same time as the camera 112 in order to facilitate real time transmission of the video. At 308 the camera 112 pops out of the vehicle 100 and captures video of the area surrounding the vehicle 100. At 310 the video may be sent to the transceiver 118 and the transceiver 118 sends the video to a remote server 120 using a wired or wireless network. At 312 the remote server 120 stores the video. The video can then be reviewed in the event an accident took place.

The activation sensor 106 can be utilized to activate components such as cameras 112, a transceiver 114, or other data recording devices. The activation sensor 106 may be an accelerometer 124, as discussed in the previous embodiments, or other types of sensors. Those skilled in the art will appreciate that the activation sensor 106 may include one or more of a velocity sensor, a temperature sensor, a pressure sensor 122, a decibel meter 126 including a microphone, an angular position sensor, a location sensor (such as GPS), a linear position sensor, a rotational motion sensor, an inertial sensor, or another type of sensor capable of measuring a parameter the may indicate if a vehicle 100 accident may be imminent. In one embodiment, the activation sensor 106 may be a microphone or decibel meter 126 and the activation threshold may be a certain decibel level, a change in decibel level measured over a certain period of time, a frequency spectrum, and/or magnitude predetermined to likely indicate and accident in progress or about to occur. For instance, a vehicle may slam on the brakes causing tires to screech against pavement. The decibel meter 126 may measure this screech noise to see if it exceeds an activation threshold and may send an activation signal to the computer 102 to activate the camera(s) 112 or other recording devices. In another embodiment, the activation sensor 106 may be a pressure sensor 122. The pressure sensor 122 may be attached to the front or rear bumper of a vehicle 100. The pressure sensor 122 may measure force per unit area or other force metrics. If another vehicle hits the front or rear bumper of the vehicle 100, the pressure sensor would measure the change in force and send an activation signal to the computer 102. In another embodiment the pressure sensor 122 may be used under a driver's seat to determine if someone is sitting in the driver's seat. The described embodiments may be similarly applied to other types of sensors.

The system may also be designed to launch a camera 112 from a vehicle. This embodiment would be similar in many respects to the embodiment with a pop-up camera that remains attached to the vehicle via a tether or other mechanical structure. Instead of a camera popping-out of the roof or some other area of the vehicle the system would launch a camera 112 into the air above the vehicle where the camera would be physically separated from the vehicle. The camera 112 may be attached to a balloon or parachute or be attached to a flying apparatus such as a drone, blimp, plane, or glider. In this embodiment the camera 112 may be directed towards the vehicle 100 and may be designed to capture the vehicle 100 and surrounding area from the air. Some major vehicle accidents involve multiple vehicles colliding in different ways. An aerial camera may capture more information about the surrounding vehicles than a vehicle mounted camera. This additional information may be vital when investigating the cause of a large accident. An aerial camera may have less risk of being damaged as compared to vehicle mounted cameras and may improve the chances of obtaining video capture through the end of an accident.

In some embodiments the camera 112 may not be a video camera. The camera 112 may be a still camera taking photographs. The above embodiments describing video cameras are equally applicable to cameras capturing still photographs. A still camera may be designed to take a high number of photographs over a short period of time in order to capture as much information as possible. In another embodiment the camera 112 may not be a camera but some other device designed to capture and record data such a microphone. A camera 112 may contain a microphone and capture both video (images) and sound.

In one embodiment of the vehicle monitoring system, additional information related to the physical characteristics of the vehicle 100 can be recorded on the video or attached to the video data. The additional information may include date, time, vehicle identification number, license plate number, make of the vehicle, model of the vehicle, color of the vehicle, or other physical characteristics. The additional information may be stored on a memory within a camera 112 or may be stored in a database with the vehicle 100. The additional information may be superimposed over the video or may be stored as a file separate to the video data. If the additional information is stored in a separate file, when the video is transmitted to the remote server 120 via a network the additional information file would also be transmitted.

In another embodiment, characteristics related to the vehicle's 100 condition at the time of video capture may be recorded on the video or attached to the video data. Vehicle conditions may include the velocity of the vehicle, directional acceleration and deceleration (e.g., forward/backward, left/right, up/down), change in directional acceleration, revolutions per minute of the engine (RPMs), the direction of the steering wheel, whether vehicle systems were engaged (e.g., stability control systems, four wheel drive, antilock brakes, etc.), the gravitational (G) forces to which the vehicle 100 is subjected, whether brakes were applied, whether a turn signal was activated, whether wind shield wipers were running, whether the radio was playing, amount of gas in the vehicle, or other variables dependent on the drivers operation of the vehicle 100. Those skilled in the art will recognize the computer 102 may collect and record other types of data relating to the operation and status of the vehicle 100 when an activation signal is received. These vehicle 100 conditions may be measured via the vehicle 100's onboard diagnostics (OBD) or may be measured by individual sensors designed to measure each variable to be included in the video or attached to the video data. The OBD-II standard includes over 300 vehicle parameters that may be measured. Any of the OBD-II standard measurements may be included with the vehicle data and video. The computer 102 may receive the vehicle 100 conditions and may superimpose the desired conditions over the video images or the vehicle 100 conditions may be stored as a separate file. If the additional information is stored in a separate file, when the video is transmitted to the remote server 120 via a network the vehicle 100 conditions file would also be transmitted.

The system may have various embodiments to determine when to stop recording after an activation signal. The cameras 112 may record for a set period of time after the activation signal and then stop recording. The recording time period may be the same for all triggering events and sensors. Alternatively different time periods may be considered based on which sensor or sensors sent the activation signal and the disparity between the sensor readings and the activation threshold. In another embodiment the cameras 112 would stop recording when the OBD or sensors determine the vehicle 100 has returned to standard operating conditions. Other options for discontinuing recording may include the vehicle 100's operator manually stopping the cameras. An operator of the remote servers and network may manually stop recording. Alternatively, once a triggering event is sensed the cameras 112 may record until the vehicle 100 is no longer in operation. In the embodiment where the cameras 112 pop-out of the vehicle 100 the cameras 112 may withdraw back into the vehicle 100 once recording has stopped.

In one embodiment the transceiver 114 may be a wireless transceiver housed within the vehicle 100. The transceiver can be a part of the computer 102 or a separate component. In this embodiment the transceiver 114 uses a standard cellular network to send video data. The transceiver 114 may use analog cellular (AMPS), Cellular Digital Packet Data (CDPD), Microburst, Cellemetry, digital cellular, PCS GSM, GMRS, GPRS, CDMA, TDMA, FDMA. The transceiver 114 may also be configured to work with a wireless network not related to cellular technology.

Vehicle accidents can result in expensive damages and settlements and such data may need to be secured against corruption. In one embodiment the video data and any attached files are encrypted before transmission via the network. The video data and attached files may be encrypted by the computer before transmission via the transceiver 114.

The network for transmission of the captured video or other vehicle data from the vehicle 100 to the remote server 120 may include a local area network (LAN), a wide area network (WAN), a virtual private network (VPN), a metropolitan area network (MAN), a cellular network, or some other type of private or public network. The remote server 120 may be connected to the network via a network interface. When the network is a public network such as a WAN or cellular network the remote server 120 may include a modem or some other type of interface for communicating via the internet. It will be appreciated that the types of networks and network connection device described are illustrative and other means communicating between the transceiver and the remote server may be considered.

In another embodiment the video data and any other related data and files are not transmitted via a network to a remote server 120. In this embodiment, the data would be stored on an event data recorder, a memory device within the vehicle 100. The memory device may be volatile or non-volatile memory. The memory device may also be some sort of auxiliary memory including flash memory, optical disc, magnetic disc, magnetic tapes, or some other form of auxiliary memory. The event data recorder may be stored in the center of the vehicle 100 to prevent damage to the recorded in the event of an accident. In another embodiment the event data recorder may be reinforced similarly to a flight data recorder (black box). The event data recorder may be reinforced with steel or titanium or some other high grade pressure and damage resistant material. The event data recorded may also be water proof in the event a vehicle 100 accident ends with the vehicle 100 under water. The event data recorded may be temperature resistant in the event of a fire or extremely cold conditions.

If the video data and other related data are stored on an event data recorder the video data may be stored for a set period of time. How long video is stored may be determined based on the size and type of memory used in the event data recorder. As an example the system may keep all video data for a month or a year before automatically deleting the video. Other time periods are also considered. Alternatively, the system may delete the oldest video data when more space is needed on the event data recorder to record new video data. The event data recorder may be designed to have memory sufficient to record all video data captured for the entire life of the vehicle.

In an embodiment that includes transmission of the video data the computer 102 and transceiver 114 may be similarly reinforced to ensure the system remains functional in the event of an accident. As previously disclosed, transmission may be continuous. Whenever the cameras 112 are recording video the remote server 120 receives a live stream of what the cameras 112 are recording. In another embodiment the computer 102 or camera 112 includes a storage device as described above. In the event the video is temporarily stored on a storage device the storage device may have similar characteristics as the event data recorder embodiments. In this embodiment the video may be recorded to the memory device before transmission to the remote server 120 via the transceiver 114. Video may be temporarily recorded. The transceiver 114 may then access the storage device and transmit recorded video at set intervals. The transmission interval may be as little as a few seconds or may be a much longer period such as once a day or once a week. Alternatively, transmission may occur every time the vehicle 100 is turned on or off. Stored video may be automatically deleted from the storage device once transmission is complete or may be saved for a longer period in order to preserve the video in multiple locations.

In an alternative embodiment the system does not have activation sensor 106 and the cameras record every time the vehicle 100 is in operation. In this embodiment the ignition serves as the alternative to the activation sensor 106. The second the vehicle 100 turns on the cameras 112 would begin recording. This embodiment may include a transceiver 114 for transmission to a remote server 120. The transceiver 114 may transmit continuously as video is captured or may transmit at set intervals as previously described. In another embodiment the system does not include a transceiver 114 but has an event data recorder.

The video capture system may be used to prevent theft or damage to a vehicle 100 when it is not in operation. If the vehicle 100 had permanently exposed cameras 112 the cameras 112 may record 24 hours a day and 7 days a week. If the cameras 112 are recording at all times, anyone stealing or damaging the vehicle 100 would be caught on video. If the system is used in this manner it would be important that the captured video may be transmitted to the remote server 120 either continuously or at a set time period. Transmission of the video data would ensure that law enforcement or another investigator may access the video and use it to determine who damaged or stole the vehicle 100. If the vehicle 100 is using the event data recorder embodiment, the event data recorder may have encryption to prevent access to the video data by someone other than law enforcement or the vehicle 100 owner. The event data recorder may also other software and hardware protection to prevent corruption of the video data.

The system may also incorporate interior cameras or other data capturing devices. An interior camera would capture the vehicle 100 operator and may add additional information for analyzing fault in the event of an accident. An interior camera may be triggered by the sensors and tied to the exterior cameras 112 or the interior camera may have a separate mechanism for determining when to capture video. Alternatively, the interior camera may capture video at all times the vehicle is in operation or may capture video 24/7 in order to work as a theft prevention tool.

The components of the system incorporated in the vehicle 100, including the activation sensor(s) 106, computer 102, transceiver 114, and camera(s) 112, may be powered by an existing vehicle 100 battery. Alternatively, the components may be powered by a secondary battery which may be charged. In the event the cameras 112 are operational at all times a secondary battery may be needed to prevent draining a vehicle's primary battery.

Figure 4:
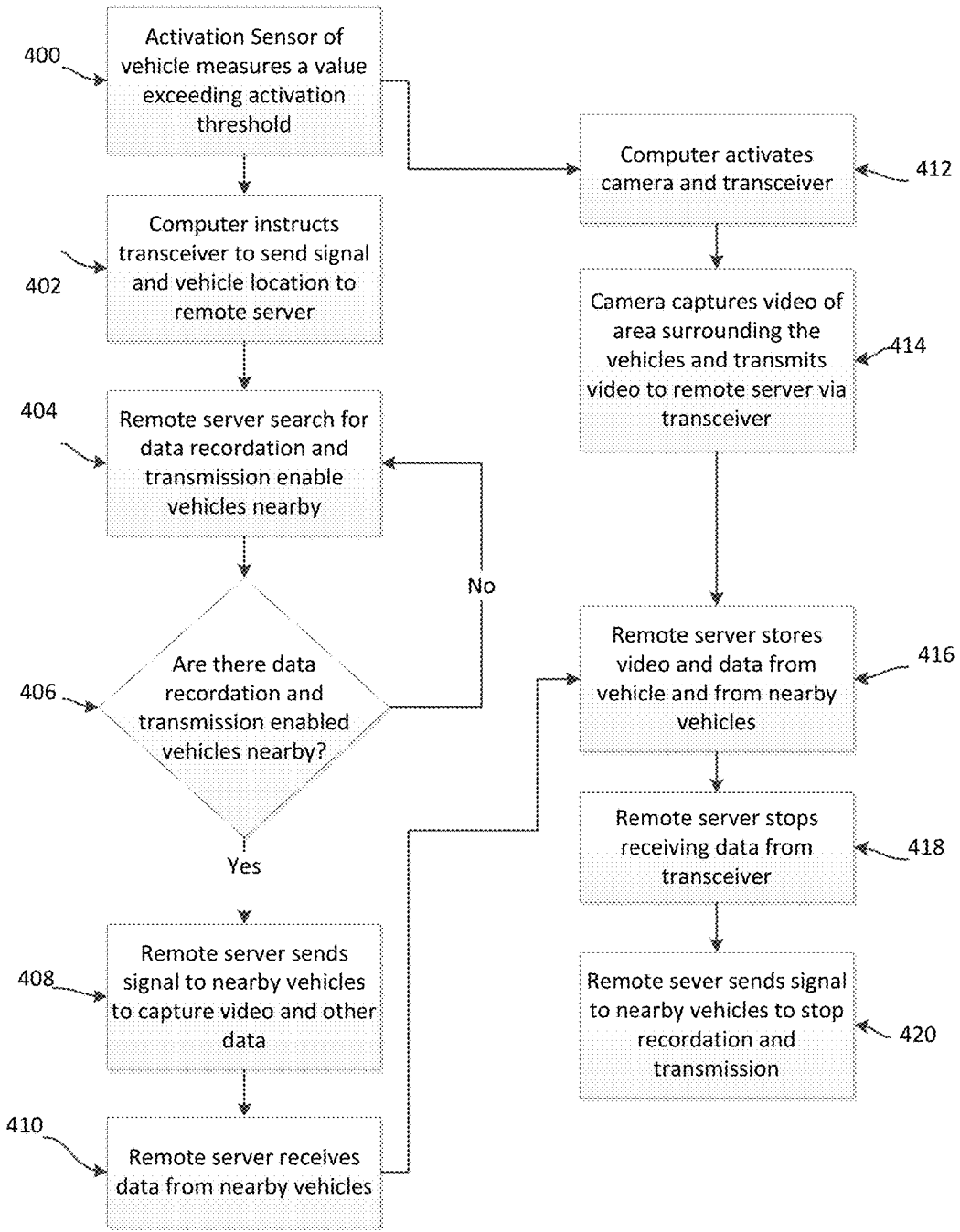
FIG. 4 is a flow diagram illustrating an embodiment for locating nearby vehicles and capturing video from nearby vehicles of the area surrounding the initiating vehicle.
Figure 5A:
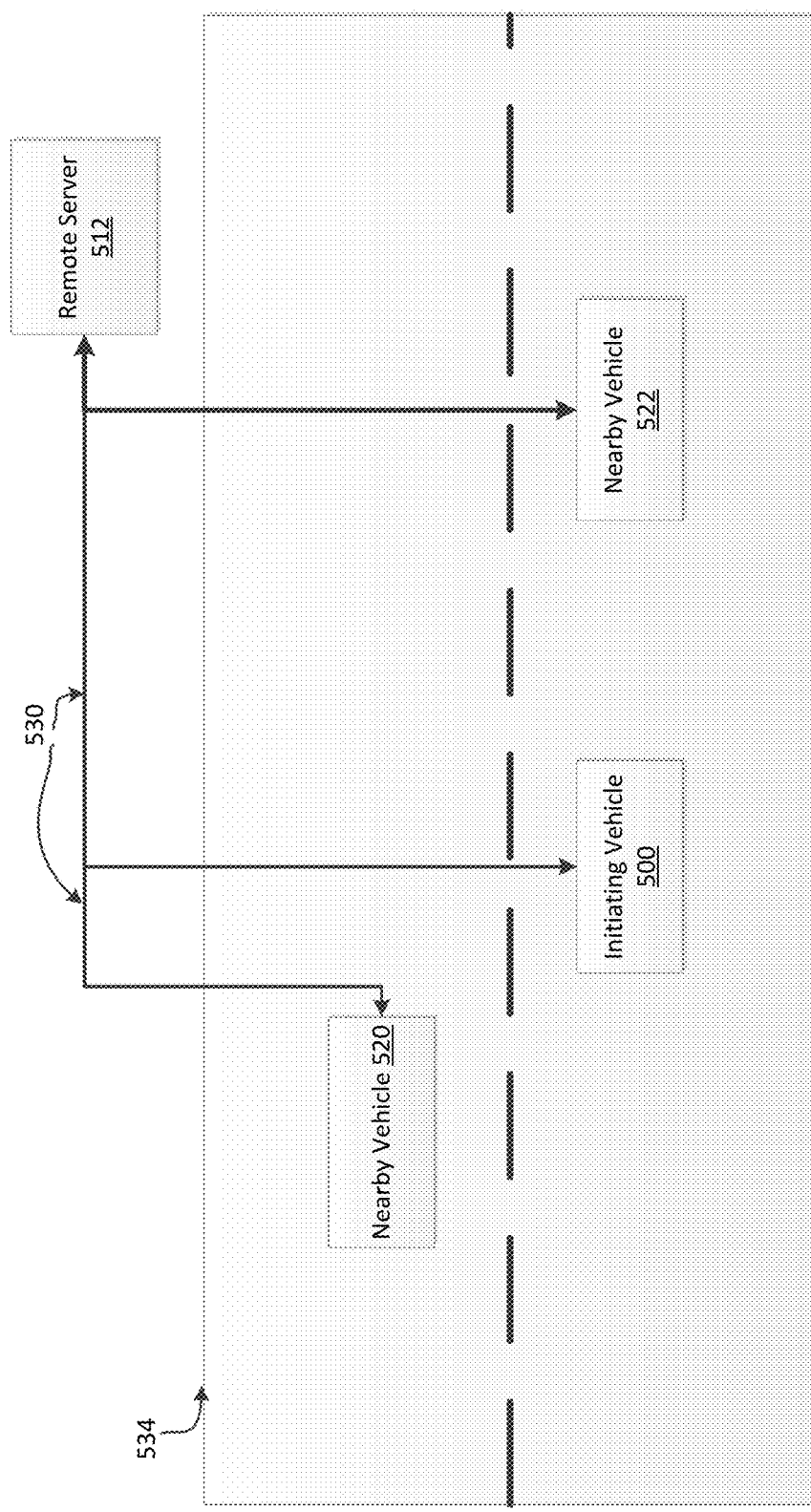
FIG. 5A illustrates an embodiment of the present disclosures incorporating multiple vehicles.

In an alternative embodiment the system incorporates multiple vehicles capable of recording video data and other data. In this embodiment the remote server 120 monitors the location of a vehicle 100 and determines if nearby vehicles are capable of capturing video. Referring to FIG. 4 and FIG. 5A, the system may be initiated in the same way as the previously disclosed embodiments, with the activation sensor of an initiating vehicle 500 measuring a value exceeding the activation threshold. In the embodiment below the vehicles may be cars traveling on road 534 but the system can incorporate any other type of vehicle traveling on any other surface. At 402, the vehicle's 500 computer sends an initiating vehicle 500 location to the remote server 512 via the vehicles transceiver. The remote server 512 then searches for nearby vehicles that incorporate the same or similar vehicle monitoring system. If the remote server 512 cannot find a nearby vehicle, at 406, it will continue searching for nearby vehicles until the transceiver ceases to transmit video data to the remote server 512. At 408, if the remote server does locate a nearby vehicle it will instruct the nearby vehicle to begin video capture. All nearby vehicles, shown as nearby vehicle 520 and nearby vehicle 522 in FIG. 5A, that received signal will then activate cameras and other recording data and transmit that data to the remote server 512 via a wireless connection 530. Wireless connection 530 may be use any of the technologies described in connection with transceiver and the remote server previously disclosed. At the same time the remote server 512 may be enabling nearby vehicles 520 and 522 the initiating vehicle 500 activates its own camera and transceiver. At 414, the system transmits the captured video to the remote server 512 as disclosed in the previous embodiments. At 416, the remote server 512 stores the video captured from the initiating vehicle 500 as well as the nearby vehicles. The nearby vehicles 520 and 522 may transmit additional information and characteristics of vehicle as disclosed previously in embodiments with a single vehicle. As discussed in previous embodiments, at 418, the remote server 512 will eventually cease receiving video and other data from the initiating vehicle 500. At 420, the remote server 512 will instruct the nearby vehicles 520 and 522, via wireless connection 530, to stop capturing and transmitting video and other data to the remote server 512.

In another embodiment, the remote server 512 monitors the location of the initiating vehicle 500 instead of the initiating vehicle 500 sending a signal to the remote server 512 indicating the location. Regardless of how the location of the initiating vehicle 500 is determined the remote server 512 can determine if other vehicles are nearby. In one embodiment, all of the vehicles utilize the Global Positioning System (GPS) sensors. The remote server 512 may continuously monitor all vehicles having a vehicle monitoring system. As soon as the remote server 512 receives notification of an activation signal and video the server would be able to determine, using GPS, which vehicles are close to the initiating vehicle 500. Other methods of the remote server tracking the vehicles are considered.

Figure 5B:
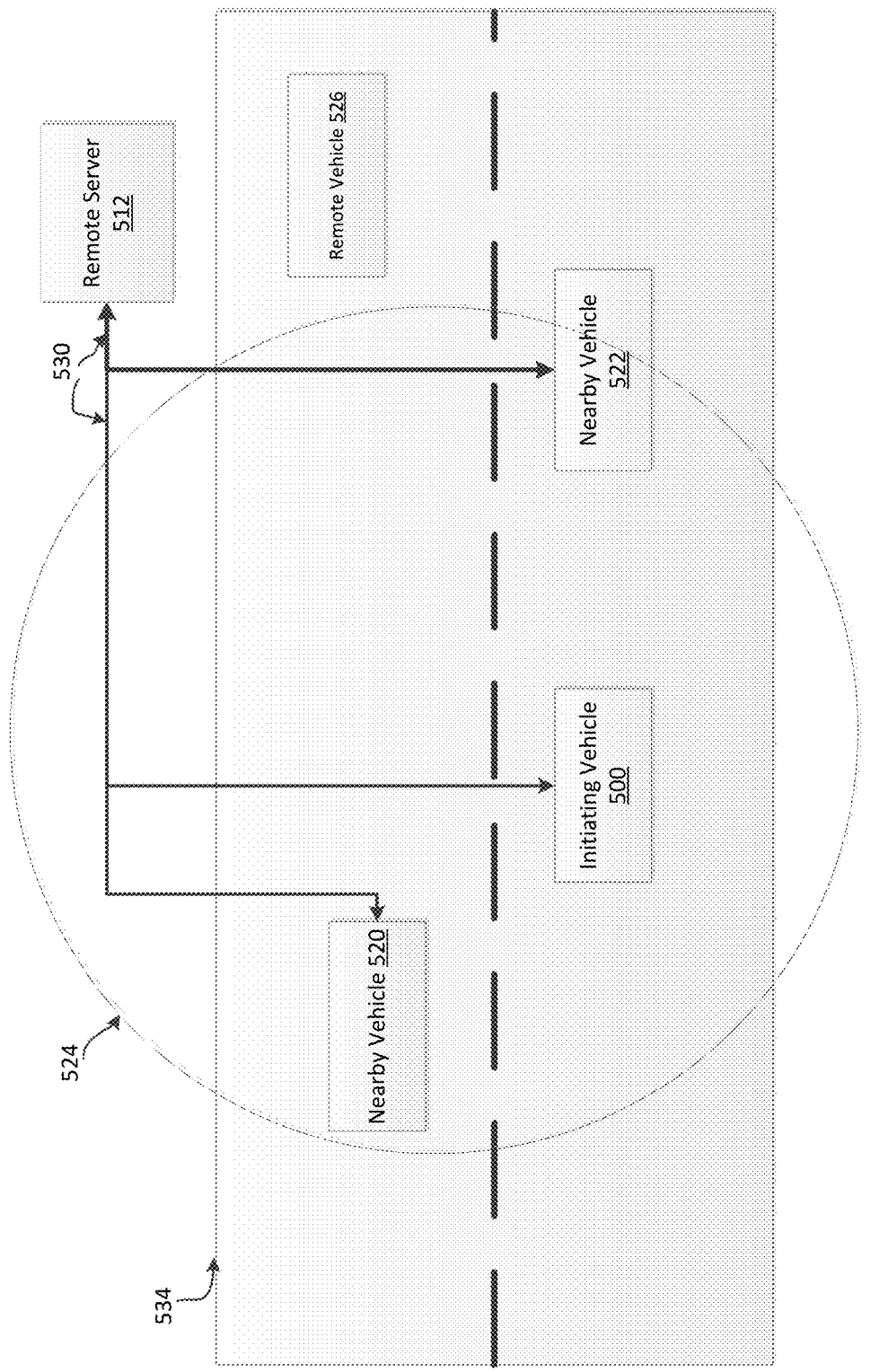
FIG. 5B illustrates another embodiment of the present disclosures incorporating multiple vehicles.

In the embodiment below the vehicles may be cars traveling on road 534 but the system can incorporate any other type of vehicle traveling on any other surface. In another embodiment, illustrated in FIG. 5B, the initiating vehicle 500 contacts nearby vehicles. In this embodiment the initiating vehicle 500 would send out a signal 524 to notify nearby vehicles 520 and 522 to begin capturing video and to transmit the video data to the remote server 512. When the initiating vehicle's 500 computer receives an activation signal from a sensor, the computer will send an instruction to the transceiver to broadcast a signal 520. Nearby vehicles 520 and 522 will detect this signal 524 and begin capturing video while transmitting the captured video data to the remote server 512. Remote vehicle 526 may not detect the signal 524 and may not initiate transmission to the remote server 512. The initiating vehicle 500 may send a variety of signals. The initiating vehicle 500 may have a radio frequency identification (RFID) system positioned on the vehicle 500. Other vehicles may have a plurality of passive RFID tags. When the initiating vehicle 500 recognizes an RFID tag, it may notify the remote server 512 of the tag and the remote server 512 may initiate video capture and streaming from the nearby vehicles 520 and 522. Alternatively, the RFID tags may be active tags that would send a signal to their respective vehicle computers to initiate transmission of captured video. Other options for determining the location of nearby vehicles include the initiating vehicle 500 sending a signal using wireless internet, a radio frequency (including CB, AM, FM, LF, MF, HF, HF, and VHF), Bluetooth, cellular signal, IEEE 802.22 (WRAN), Z-wave, or ZigBee. The transmitters and receivers in the vehicles for contacting other nearby vehicles can be combined with the transceiver for contacting the remote server 512 or they can be separate components.

Figure 5C:
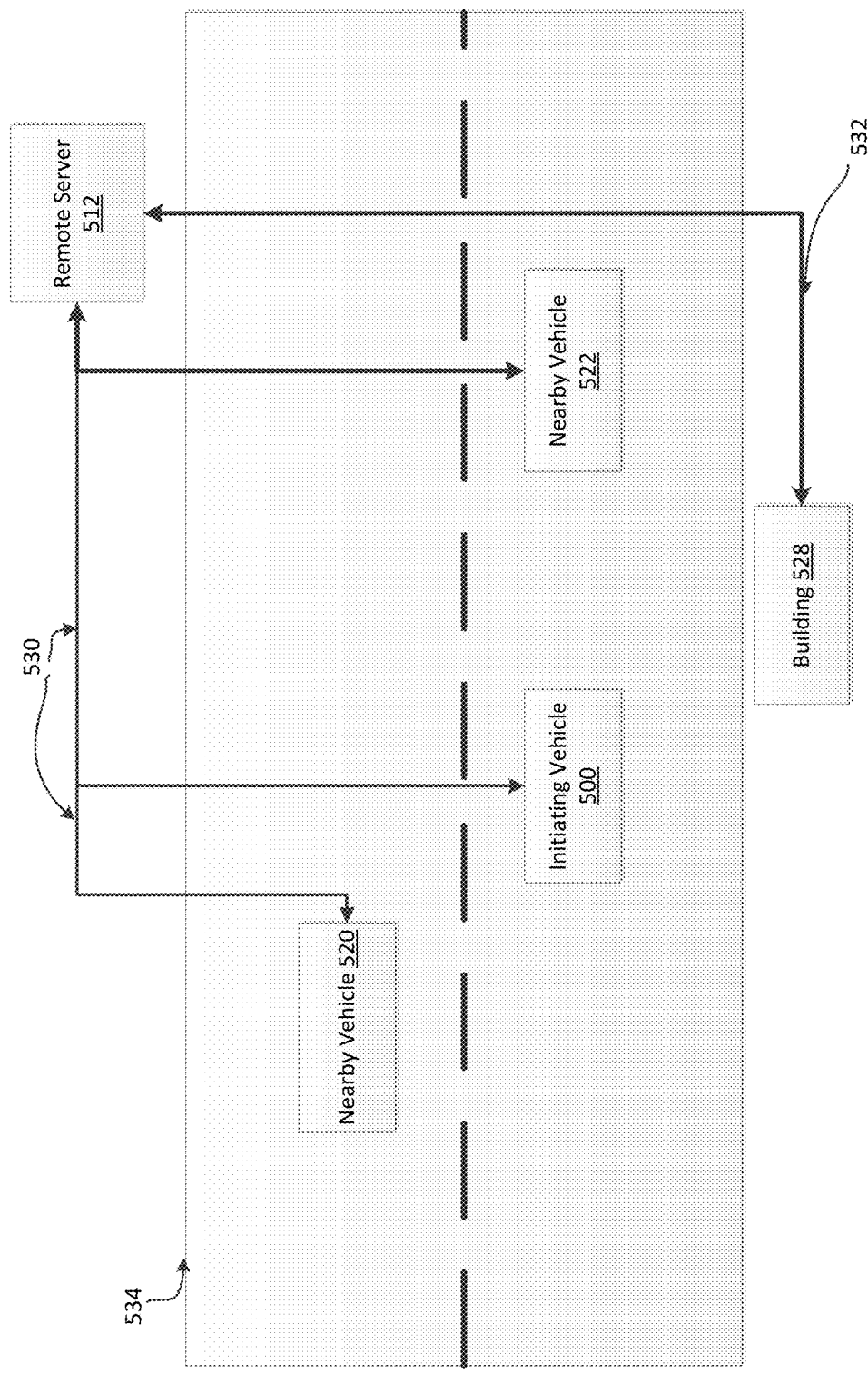
FIG. 5C illustrates an embodiment of the present disclosures incorporating multiple vehicles and a building.
Figure 5D:
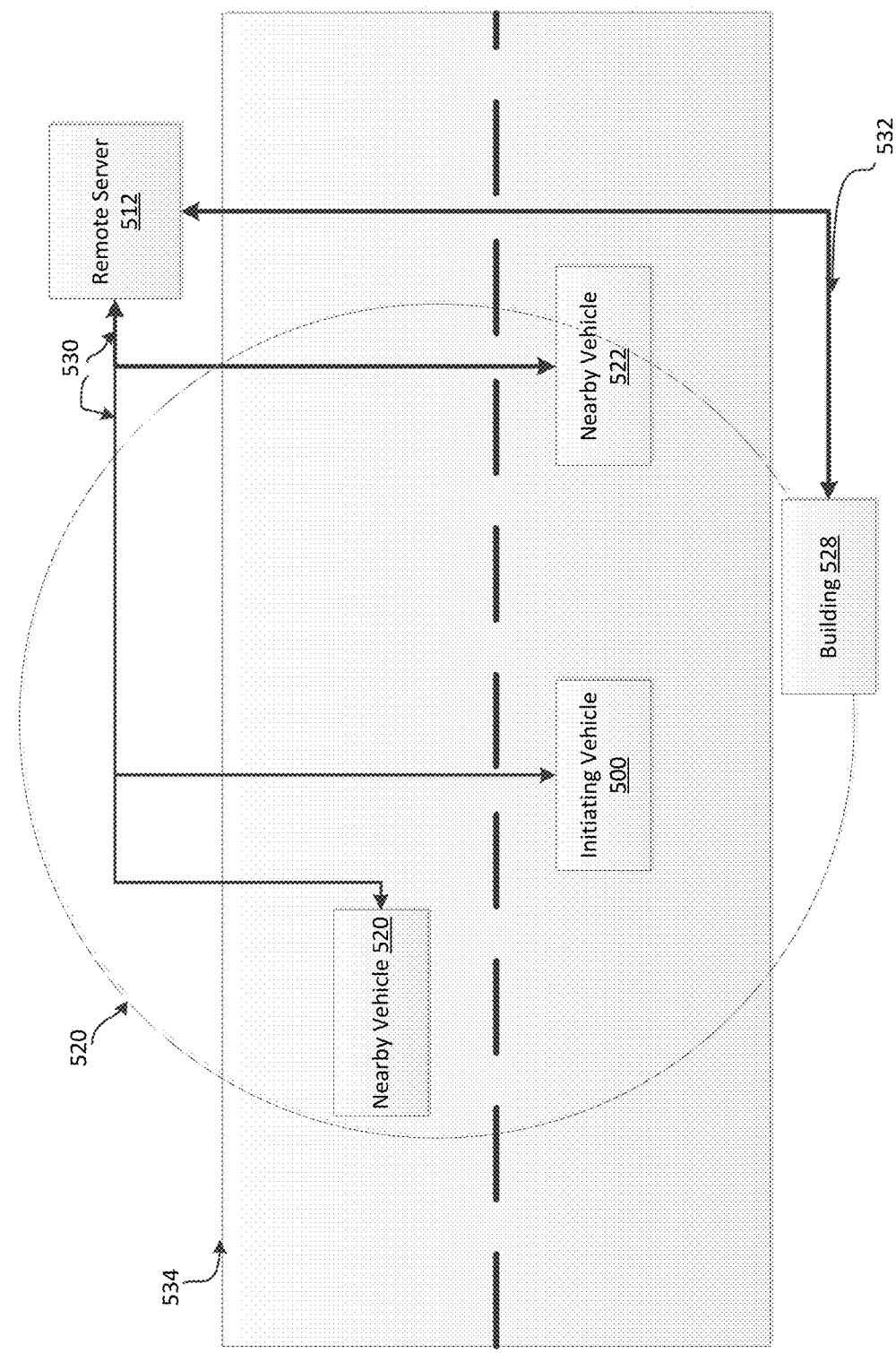
FIG. 5D illustrates another embodiment of the present disclosures incorporating multiple vehicles and a building.

In the embodiments below the vehicles may be cars traveling on road 534 but the system can incorporate any other type of vehicle traveling on any other surface. In an alternative embodiment, as shown in FIGS. 5C and 5D, the system may incorporate recording and transmission devices on buildings or other stationary objects. In the embodiment shown in FIG. 5C, the system works similarly to the embodiments disclosed in FIGS. 4 and 5A. In this embodiment the remote server 512 may contact a building 528, via connection 532, with a camera that is nearby initiating vehicle 500. If the building 528 receives a signal it may activate cameras and other data recording devices and it may transmit, via connection 532, that data to the remote server 512. In the embodiment shown in FIG. 5D, the system works similarly to the embodiment disclosed in FIG. 5B. In this embodiment, the building 528 is within the transmission range of signal 520 transmitted by initiating vehicle 500. Building 528 received signal 520 and it may activate cameras and other data recording devices and it may transmit, via connection 532, that data to the remote server 512. Connection 532 may be a wireless or wired connection. Connection 532 may be a wireless connection using any of the technologies described in connection with transceiver and the remote server previously disclosed. Connection 532 may be via Ethernet, infrared, or some other wired connection. These embodiments are not limited to incorporating buildings. Any stationary camera or recording device can used in conjunction with the embodiments disclosed in FIGS. 5C and 5D. Recording devices may include surveillance cameras, traffic cameras, red light cameras, automated teller machine cameras, CCTV cameras, webcams, mobile device cameras and microphones, microphones, motion sensors, infrared sensors, or other types of recording devices.

All of the embodiments with respect to the sensors 106, cameras 112, camera positions, computer 102, transceivers 114, networks, and remote servers 120 discussed in the single vehicle embodiments above can be applied to the multiple vehicle embodiments. The vehicles contacted by the initiating vehicle 500 may be designed according to any of the embodiments previously discussed.

The definition of "close" and "nearby" may differ depending on the circumstances. A vehicle traveling at higher speed may necessitate activating cameras on vehicles that are further away than vehicles traveling at lower speed. In one embodiment the definition of "close" and/or "nearby" may be 50 meters. In another embodiment the definition may be a half of a mile. Often times, accidents result in a vehicle stopping while the surrounding vehicles may continue moving. If the timing of the system is not instantaneous this may require the server contacting vehicles that were once close to the initiating vehicle but are now further way. Depending on the capabilities of the server and systems "close" and and/or "nearby" may be anything from 5 meters to 25 miles. For instance, with regard to the RFID embodiment, passive RFID tags have a ranges of approximately 6 meters while an active RFID tag can be read up to over 100 meters.

At the back end, the remote server may be connected to an insurance claim management system. The insurance claim management system could automatically compare the location of all insurance claims to the locations of vehicles that transmitted video and other data to the remote server. The system could match received video to insurance claims based on the locations, dates, and times of the claims and received video. The insurance claim management system may allow an insurance investigator or adjuster to view the video data as well as view the vehicle characteristic data. The system may include an automated system that views the data received at the remote server. The automated system may automatically review all received data and be capable of automatically sending notifications of vehicle accidents. The notifications may be sent to emergency responders, vehicle owners, insurance providers, or any other entity that may have an interest in receiving accident notifications. The insurance claim management system may be capable of automatic analysis. The system may recognize license plates, street signs, vehicle makes and models, and other vital information. The system may automatically populate information into an insurance claim thereby eliminating the need for an insurance company employee to manually watch all captured video and enter information. The system may make a preliminary recommendation of fault for any accident captured.

What is claimed is:

1. A method for predicting an event surrounding a vehicle based on monitored parameters, the method comprising:
controlling, by a processor, a sensor to obtain sensor information for monitoring a vehicle parameter corresponding to the vehicle;
determining, by the processor, the sensor information is greater than an acceptable threshold;
controlling, by the processor, an image capturing device in communication with the vehicle to capture an image depicting an area surrounding the vehicle;
transmitting, by a network interface, the image to a remote server;
generating, by the processor, an event detection signal;
transmitting, by the network interface, the event detection signal to the remote server, wherein the remote server is configured to:
receive the event detection signal;
determine an external image capturing device located within a predetermined distance from the vehicle;
transmit a control signal to the external image capturing device, wherein the control signal causes the external image capturing device to capture a supplemental image depicting the vehicle and the area surrounding the vehicle; and
receive the supplemental image from the external image capturing device.

2. The method of claim 1, wherein the sensor information is a vehicle speed of the vehicle.

3. The method of claim 2, further comprising determining the vehicle speed is greater than an acceptable speed threshold when a monitored speed of the vehicle has decreased at least a first amount in a predetermined period of time.

4. The method of claim 1, wherein the sensor information is a decibel level outside of the vehicle.

5. The method of claim 4, further comprising determining the decibel level is greater than an acceptable decibel threshold when a monitored decibel level of the vehicle has increased at least a first amount over a predetermined time.

6. The method of claim 1, wherein the sensor is a pressure sensor and the vehicle parameter comprises a pressure measured by the pressure sensor.

7. The method of claim 1, wherein the sensor and processor are independent of a vehicle on-board diagnostics system.

8. The method of claim 1, wherein the image depicts a panoramic view of the area surrounding the vehicle.

9. The method of claim 1, wherein the image is a still image.

10. The method of claim 1, wherein the image is captured as an image frame comprising a video including a plurality of image frames.

11. The method of claim 1, further comprising controlling, by the processor, a second image capturing device in communication with the vehicle to capture a supplemental image based on the determination the vehicle parameter is greater than the acceptable threshold.

12. The method of claim 11, wherein the supplemental image depicts an interior cabin of the vehicle.

13. A method for predicting an event surrounding a first vehicle, the method comprising:
controlling, by a processor of the first vehicle, a sensor of the first vehicle to obtain sensor information for monitoring a vehicle parameter corresponding to the first vehicle;
detecting, by the processor of the first vehicle, a second vehicle located within a predetermined distance from the first vehicle;
determining, by the processor of the first vehicle, the sensor information is greater than an acceptable threshold;
generating, by the processor, a control signal;
transmitting, by a network interface, the control signal to the second vehicle, wherein the control signal causes an image capturing device in communication with the second vehicle to capture an image depicting the first vehicle and an area surrounding the first vehicle;
receiving, by the network interface, the image from the second vehicle;
transmitting, by the network interface, the image to a server at a location remote from the first vehicle and second vehicle;
determining, by the processor, a vehicle location of the first vehicle when the image depicting the area surrounding the first vehicle was captured;
parsing, by the processor, insurance claims stored on the remote server;
identifying, by the processor, target insurance claims submitted to an insurance provider during a period of time when the image depicting the area surrounding the first vehicle was captured;
determining, by the processor, locations identified from the target insurance claims;
comparing, by the processor, the locations identified from the target insurance claims to the vehicle location of the first vehicle when the image depicting the area surrounding the first vehicle was captured; and
attaching, by the processor, the image to insurance claims with matching locations based on the comparison.

14. The method of claim 13, wherein a location of the second vehicle is detected using a global positioning system.

15. The method of claim 13, further comprising transmitting characteristics of the second vehicle to the server.

16. The method of claim 13, further comprising:
storing the image on a damage resistant non-volatile memory of the first vehicle.

17. The method of claim 13, further comprising:
in response to detecting the second vehicle located within the predetermined distance from the first vehicle, transmitting, by the processor of the first vehicle, an identification signal to the second vehicle, wherein the image capturing device in communication with the second vehicle initiates video capture of the first vehicle upon recognizing the identification signal.

18. A vehicle monitoring device, comprising:
an interface configured to communicate with a remote server;
a sensor configured to obtain sensor information for monitoring a vehicle parameter of a first vehicle; and
a processor in communication with the interface and the sensor, the processor configured to:
determine the sensor information is greater than an acceptable threshold;
control an image capturing device in communication with the vehicle to capture an image depicting an area surrounding the vehicle;
transmit, via the interface, the image to the remote server;
generate an event detection signal;
transmit, via the interface, the event detection signal to the remote server, wherein the remote server is configured to:
receive the event detection signal;
determine an external image capturing device located within a predetermined distance from the vehicle;
transmit a control signal to the external image capturing device, wherein the control signal causes the external image capturing device to capture a supplemental image depicting the vehicle and the area surrounding the vehicle; and
receive the supplemental image from the external image capturing device.

19. The vehicle monitoring device of claim 18, wherein the processor is further configured to:
communicate, through the interface, with a global positioning system to detect a second vehicle located within a predetermined distance from the first vehicle;
receive, from the sensor, the sensor information;
determine the sensor information is greater than an acceptable threshold;
generate a control signal;
transmit, via the interface, the control signal to the second vehicle, wherein the control signal causes an image capturing device in communication with the second vehicle to capture an image depicting the first vehicle and an area surrounding the first vehicle;
receive, via the interface, the image from the second vehicle;

transmit, via the interface, the image to the remote server; and in response to detecting the second vehicle located within the predetermined distance from the first vehicle, control the interface to transmit an identification signal to the second vehicle, wherein the image capturing device in communication with the second vehicle initiates video capture of the first vehicle upon recognizing the identification signal.

20. The vehicle monitoring device of claim 18, wherein the processor is further configured to:

determine a vehicle location of the first vehicle when the image depicting the area surrounding the first vehicle was captured;

parse insurance claims stored on the remote server;

identify target insurance claims submitted to an insurance provider during a period of time when the image depicting the area surrounding the first vehicle was captured;

determine locations identified from the target insurance claims;

compare the locations identified from the target insurance claims to the vehicle location of the first vehicle when the image depicting the area surrounding the first vehicle was captured; and attach the image to insurance claims with matching locations based on the comparison.

* * * * *